(12) United States Patent
Yoshimura et al.

(10) Patent No.: US 10,293,479 B2
(45) Date of Patent: May 21, 2019

(54) ROBOT AND ROBOT SYSTEM

(71) Applicant: Seiko Epson Corporation, Tokyo (JP)

(72) Inventors: Kazuto Yoshimura, Matsumoto (JP); Kazushige Akaha, Azumino (JP)

(73) Assignee: Seiko Epson Corporation (JP)

( * ) Notice: Subject to any disclaimer, the term of this patent is extended or adjusted under 35 U.S.C. 154(b) by 343 days.

(21) Appl. No.: 15/134,658

(22) Filed: Apr. 21, 2016

(65) Prior Publication Data

US 2016/0311107 A1    Oct. 27, 2016

(30) Foreign Application Priority Data

Apr. 27, 2015    (JP) .................................. 2015-090068

(51) Int. Cl.
*B25J 9/04*    (2006.01)
*B25J 9/00*    (2006.01)

(52) U.S. Cl.
CPC ............ *B25J 9/0018* (2013.01); *B25J 9/047* (2013.01)

(58) Field of Classification Search
CPC ... B25J 9/045; B25J 9/046; B25J 9/047; B25J 17/025; B25J 21/005; B25J 9/0018
USPC .......................... 414/732, 735, 738, 739, 740
See application file for complete search history.

(56) References Cited

U.S. PATENT DOCUMENTS

| | | | |
|---|---|---|---|
| 9,037,293 B2 | 5/2015 | Gomi et al. | |
| 2003/0221504 A1* | 12/2003 | Stoianovici | B25J 9/06 74/490.04 |
| 2014/0067120 A1* | 3/2014 | Gomi | B25J 9/1638 700/254 |
| 2016/0288335 A1* | 10/2016 | Akaha | B25J 9/046 |
| 2016/0288336 A1* | 10/2016 | Toshimitsu | B25J 9/046 |
| 2016/0288339 A1* | 10/2016 | Akaha | B25J 21/00 |
| 2016/0288340 A1* | 10/2016 | Akaha | B25J 21/00 |
| 2016/0288341 A1* | 10/2016 | Akaha | B25J 9/0018 |
| 2016/0288342 A1* | 10/2016 | Akaha | B25J 21/00 |
| 2016/0311107 A1* | 10/2016 | Yoshimura | B25J 9/0018 |
| 2016/0311120 A1* | 10/2016 | Goto | B25J 19/0029 |
| 2016/0318179 A1* | 11/2016 | Komatsu | B25J 9/0018 |
| 2016/0318180 A1* | 11/2016 | Miyasaka | B25J 9/047 |
| 2017/0066129 A1* | 3/2017 | Motoyoshi | B25J 9/1651 |
| 2017/0080577 A1* | 3/2017 | Motoyoshi | B25J 13/088 |
| 2017/0120444 A1* | 5/2017 | Motoyoshi | B25J 9/1641 |
| 2017/0120458 A1* | 5/2017 | Akaha | B25J 9/0009 |
| 2017/0291297 A1* | 10/2017 | Miyasaka | B25J 9/047 |

(Continued)

FOREIGN PATENT DOCUMENTS

JP    2014-046401 A    3/2014

*Primary Examiner* — Ronald P Jarrett
*Assistant Examiner* — Brendan P Tighe
(74) *Attorney, Agent, or Firm* — Harness, Dickey & Pierce, P.L.C.

(57) ABSTRACT

A robot includes: a first arm rotatable about a first rotation axis; a second arm provided on the first arm rotatably about a second rotation axis that is a different axial direction from an axial direction of the first rotation axis; and a moving part provided on the second arm rotatably about a third rotation axis. The moving part has a third arm and a fourth arm. A maximum length of the moving part is longer than a length of the second arm and shorter than twice the length of the second arm. The first arm has a length longer than the length of the second arm. The first arm and the second arm can overlap with each other, as viewed from the axial direction of the second rotation axis.

11 Claims, 8 Drawing Sheets

(56) References Cited

U.S. PATENT DOCUMENTS

| | | | |
|---|---|---|---|
| 2018/0001486 A1* | 1/2018 | Toshimitsu | B25J 18/04 |
| 2018/0001487 A1* | 1/2018 | Miyasaka | B25J 9/126 |
| 2018/0117767 A1* | 5/2018 | Yokota | B25J 9/1679 |
| 2018/0147719 A1* | 5/2018 | Akaha | B25J 9/0009 |
| 2018/0194009 A1* | 7/2018 | Kojima | B25J 9/1692 |
| 2018/0222041 A1* | 8/2018 | Aoyama | B25J 9/043 |
| 2018/0236671 A1* | 8/2018 | Yoshimura | B25J 19/0075 |
| 2018/0319022 A1* | 11/2018 | Yoshimura | B25J 9/047 |
| 2018/0326598 A1* | 11/2018 | Miyasaka | B25J 9/047 |
| 2018/0333844 A1* | 11/2018 | Inoue | B25J 9/047 |
| 2018/0361567 A1* | 12/2018 | Akaha | B25J 9/046 |

* cited by examiner

ROBOT AND ROBOT SYSTEM

BACKGROUND

1. Technical Field

The present invention relates to a robot and a robot system.

2. Related Art

According to the related art, a robot having a robot arm is known. The robot arm has a plurality of arms (arm members) connected together via joint parts, and an end effector, for example, a hand, is installed on the arm on the most distal end side (most downstream side). The joint parts are driven by a motor. As the joint parts are driven, the arms rotate. The robot thus grasps an object with the hand, for example, then moves the object to a predetermined place, and carries out predetermined work such as assembly.

As such a robot, JP-A-2014-46401 discloses a vertical multi-joint robot. In the robot disclosed in JP-A-2014-46401, an operation of moving the hand to a position that is 180 degrees different about a first rotation axis, which is a rotation axis on the most proximal end side (most upstream side) (rotation axis extending in a vertical direction), in relation to the base, is carried out by rotating a first arm, which is an arm on the most proximal end side, about the first rotation axis in relation to the base.

The robot disclosed in JP-A-2014-46401 needs a large space to prevent interference of the robot when moving the hand to a position that is 180 degrees different about the first rotation axis in relation to the base.

SUMMARY

An advantage of some aspects of the invention is to provide a robot and a robot system in which an operation of moving the position of the distal end part of the robot to a position that is 180 degrees different about the first rotation axis can be achieved even when the space to prevent interference of the robot is small.

The invention can be implemented as the following forms or application examples.

APPLICATION EXAMPLE 1

This application example of the invention is directed to a robot including: a first arm rotatable about a first rotation axis; a second arm provided on the first arm rotatably about a second rotation axis that is a different axial direction from an axial direction of the first rotation axis; and a moving part provided on the second arm rotatably about a third rotation axis. The moving part has a third arm and a fourth arm. A maximum length of the moving part is longer than a length of the second arm and shorter than twice the length of the second arm. The first arm has a length longer than the length of the second arm. The first arm and the second arm can overlap with each other, as viewed from the axial direction of the second rotation axis.

With this configuration, the space to prevent interference of the robot when moving the distal end of the second arm to a position that is 180 degrees different about the first rotation axis can be reduced.

Also, the distal end of the moving part can be prevented from interfering with the second arm.

APPLICATION EXAMPLE 2

In the robot according to the application example of the invention, it is preferable that the maximum length of the moving part is longer than 1.2 times the length of the second arm and shorter than 1.8 times the length of the second arm.

With this configuration, the distal end of the moving part can be prevented from interfering with the second arm.

APPLICATION EXAMPLE 3

In the robot according to the application example of the invention, it is preferable that the third arm is provided on the second arm rotatably about the third rotation axis, and that the fourth arm is provided on the third arm rotatably about a fourth rotation axis.

With this configuration, more complex operations can be carried out easily.

APPLICATION EXAMPLE 4

It is preferable that the robot according to the application example of the invention includes a fifth arm provided on the fourth arm rotatably about a fifth rotation axis, and a sixth arm provided on the fifth arm rotatably about a sixth rotation axis.

With this configuration, more complex operations can be carried out easily.

APPLICATION EXAMPLE 5

It is preferable that the robot according to the application example of the invention includes a first motor which rotates the first arm, a second motor which rotates the second arm, and a third motor which rotates the moving part, and that the second motor has a capacity equal to or above a capacity of the third motor and equal to or below twice the capacity of the third motor.

With this configuration, a reduction in size and weight of the robot can be achieved.

APPLICATION EXAMPLE 6

In the robot according to the application example of the invention, it is preferable that the capacity of the second motor is equal to or above the capacity of the third motor and equal to or below 1.5 times the capacity of the third motor.

With this configuration, a reduction in size and weight of the robot can be achieved.

APPLICATION EXAMPLE 7

In the robot according to the application example of the invention, it is preferable that the capacity of the second motor is equal to or above the capacity of the third motor and equal to or below 1.1 times the capacity of the third motor.

With this configuration, a reduction in size and weight of the robot can be achieved.

APPLICATION EXAMPLE 8

It is preferable that the robot according to the application example of the invention has a linear member including at least one of a wire and a pipe, and that the linear member has a U-shaped folding part arranged on an outer circumference of at least one of the first motor, the second motor and the third motor.

With this configuration, when the robot is driven, the linear member can be restrained from being twisted or fractured. Therefore, damage to the linear member can be restrained and durability can be improved.

APPLICATION EXAMPLE 9

In the robot according to the application example of the invention, it is preferable that a maximum lateral width of the first arm is equal to or greater than a maximum lateral width of the second arm and the moving part, as viewed from the axial direction of the second rotation axis.

With this configuration, the robot is compact when the first arm, the second arm and the moving part overlap with each other, as viewed from the axial direction of the second rotation axis. For example, installing the robot, carrying the robot, packing the robot and the like can be carried out easily.

APPLICATION EXAMPLE 10

In the robot according to the application example of the invention, it is preferable that a brake for braking the second arm and a brake for braking the moving part are provided, and that a brake for braking the first arm is not provided.

With this configuration, a reduction in size and weight and simplification of the structure of the robot can be achieved because of the absence of a brake for braking the first arm.

APPLICATION EXAMPLE 11

This application example of the invention is directed to a robot system including: a cell; and a robot provided in the cell. The robot includes: a first arm rotatable about a first rotation axis; a second arm provided on the first arm rotatably about a second rotation axis that is a different axial direction from an axial direction of the first rotation axis; and a moving part provided on the second arm rotatably about a third rotation axis. The moving part has a third arm and a fourth arm. A maximum length of the moving part is longer than a length of the second arm and shorter than twice the length of the second arm. The first arm has a length longer than the length of the second arm. The first arm and the second arm can overlap with each other, as viewed from the axial direction of the second rotation axis.

With this configuration, the space to prevent interference of the robot when moving the distal end of the second arm to a position that is 180 degrees different about the first rotation axis can be reduced. This enables miniaturization of the cell, and the installation space for installing the robot system can be reduced.

Also, the distal end of the moving part can be prevented from interfering with the second arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the robot system according to the invention will be described in detail on the basis of a preferred embodiment shown in the accompanying drawings.

Figure 1:
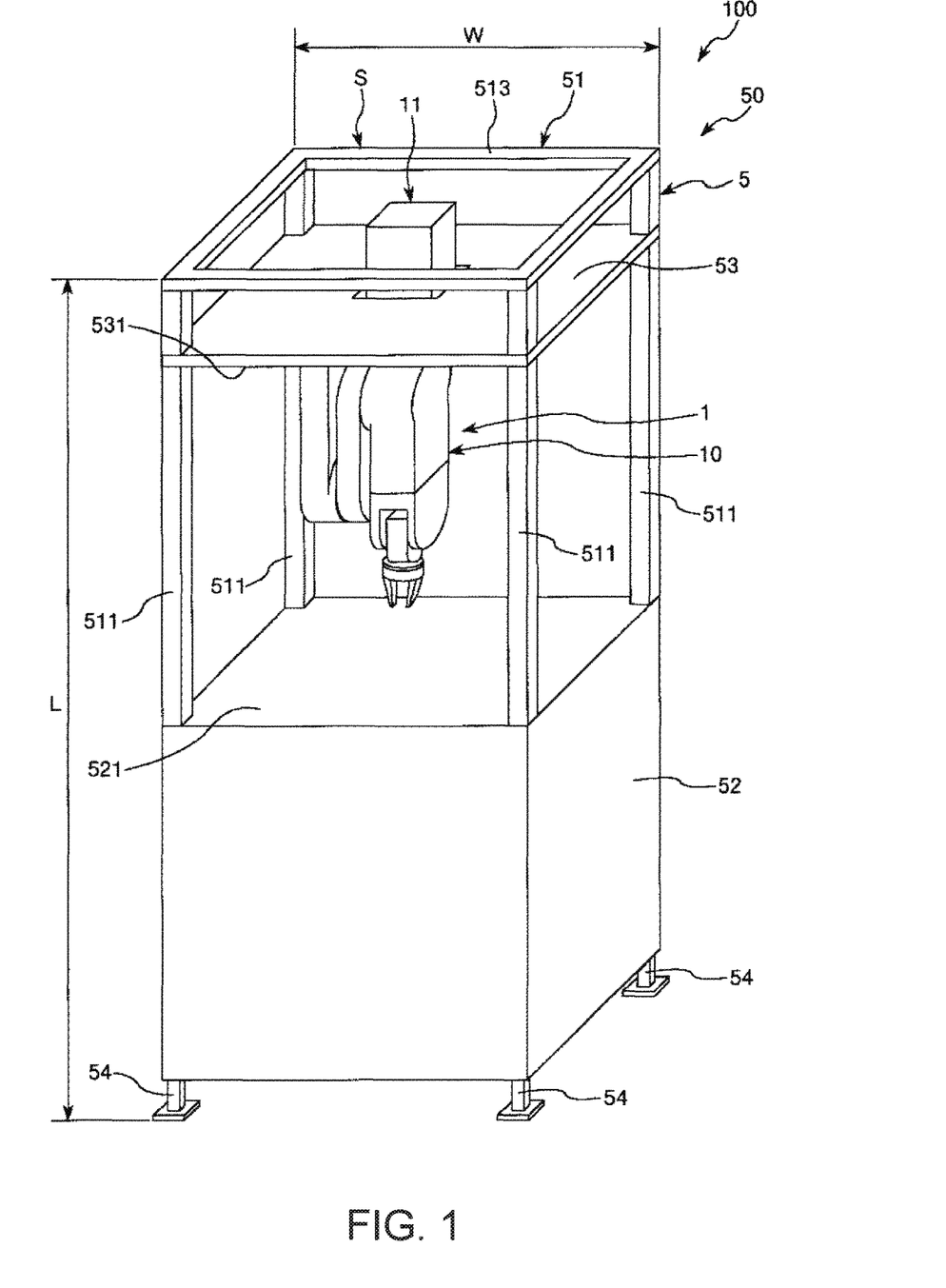
FIG. 1 is a perspective view showing an embodiment of the robot system according to the invention.
Figure 2:
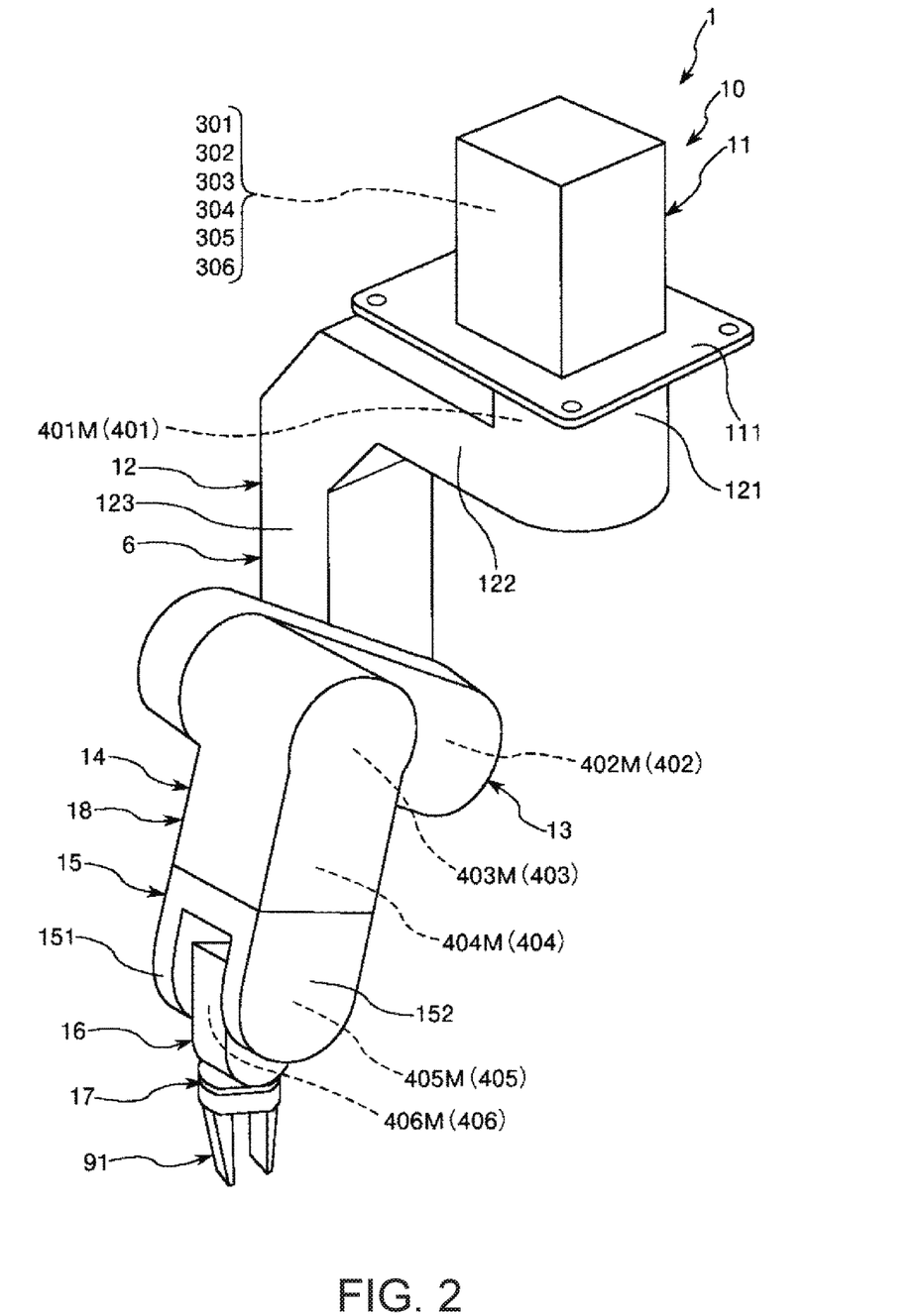
FIG. 2 is a perspective view showing a robot in the robot system shown in FIG. 1.
Figure 3:
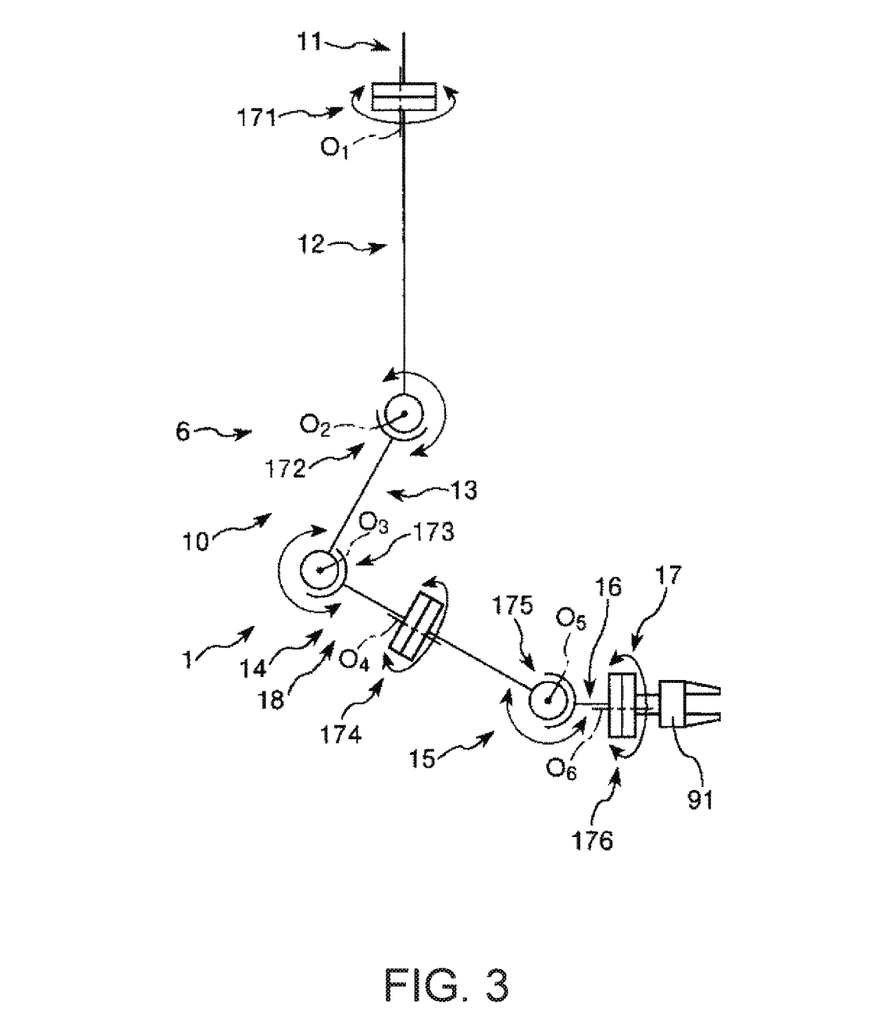
FIG. 3 is a schematic view showing the robot in the robot system shown in FIG. 1.
Figure 4:
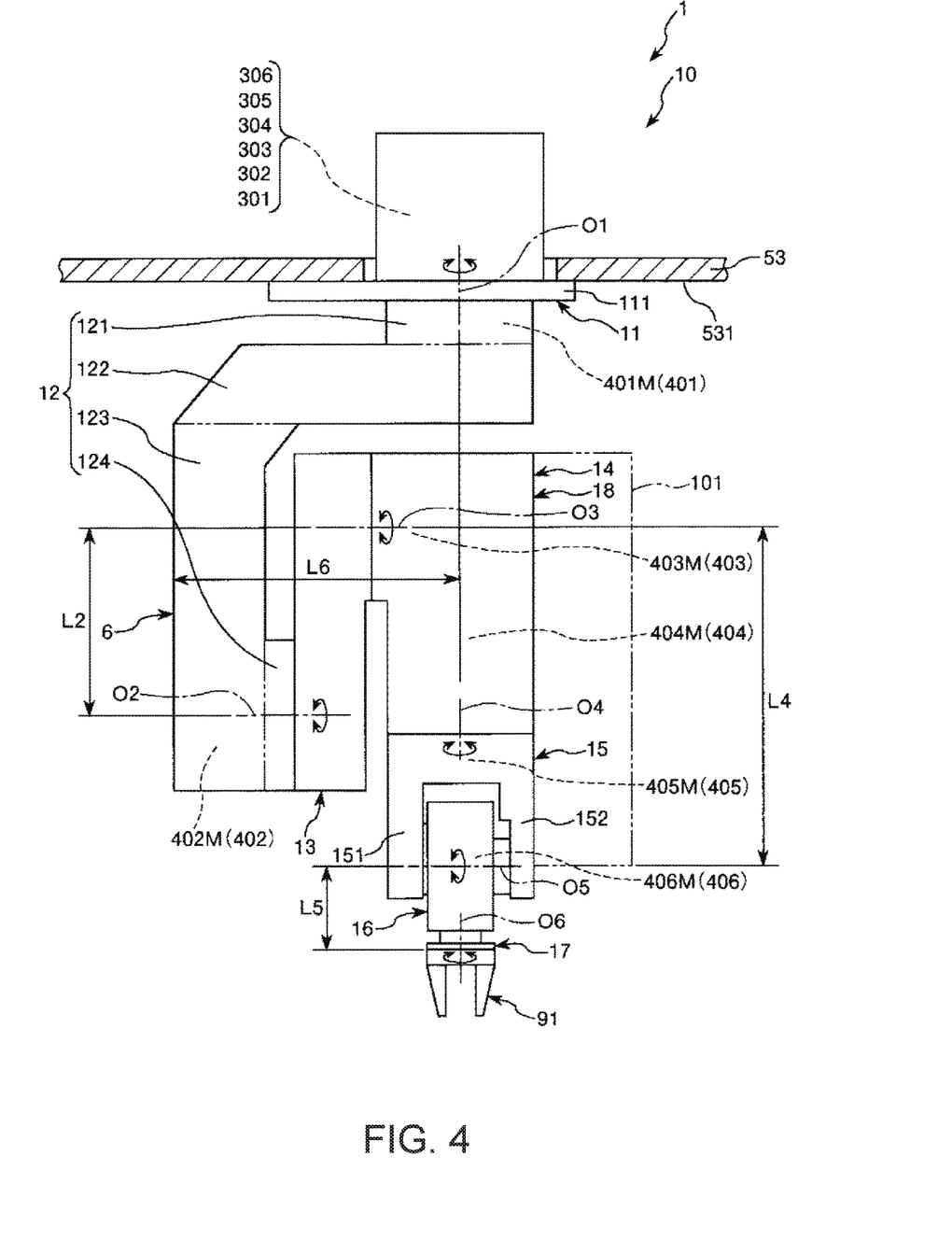
FIG. 4 shows the robot in a front view of the robot system shown in FIG. 1.
Figure 5:
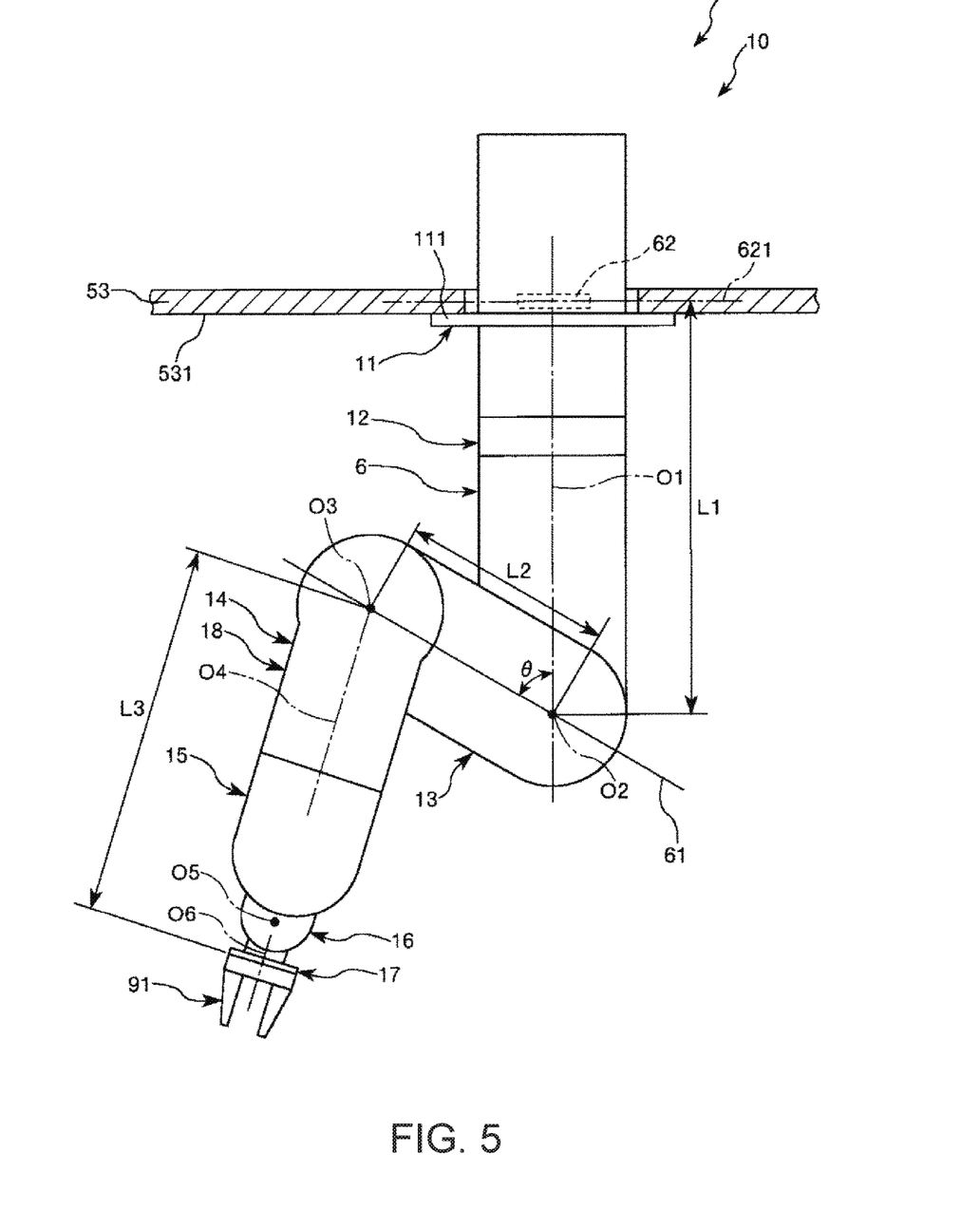
FIG. 5 shows the robot in a side view of the robot system shown in FIG. 1.
Figure 6:
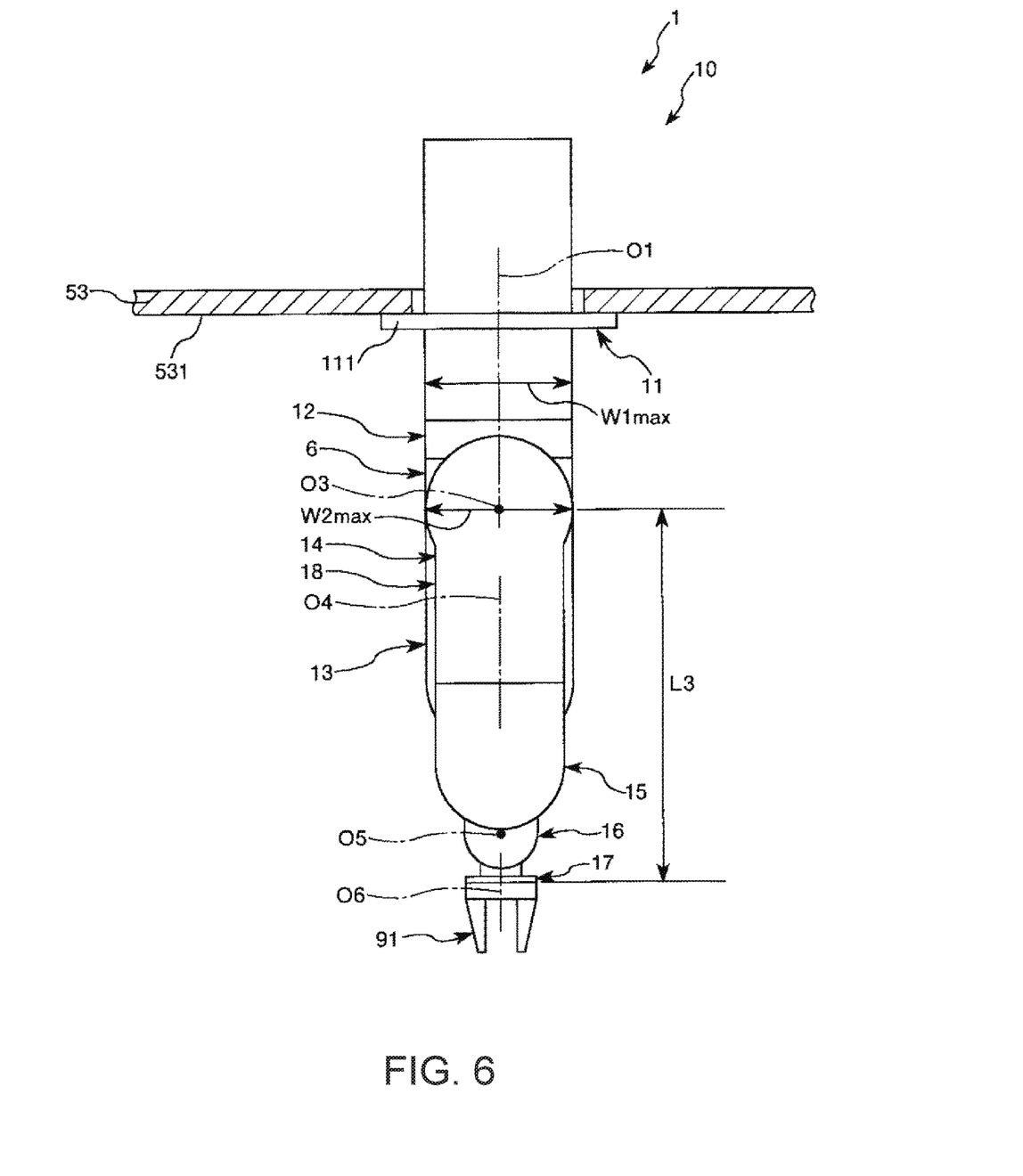
FIG. 6 shows the robot in a side view of the robot system shown in FIG. 1.
Figure 7A:
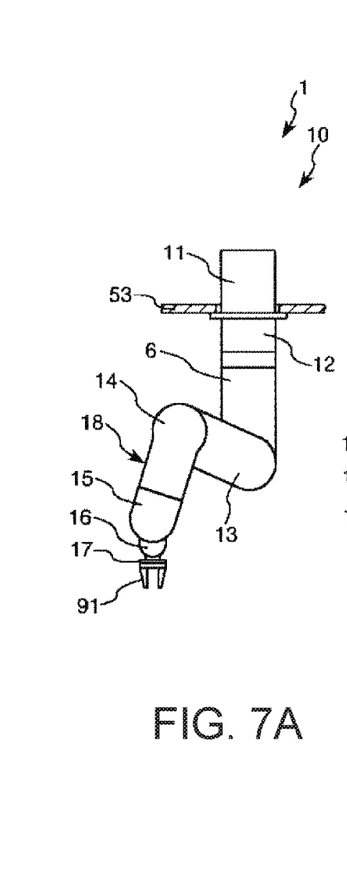
FIGS. 7A to 7E explain an operation when the robot in the robot system shown in FIG. 1 carries out work.
Figure 7B:
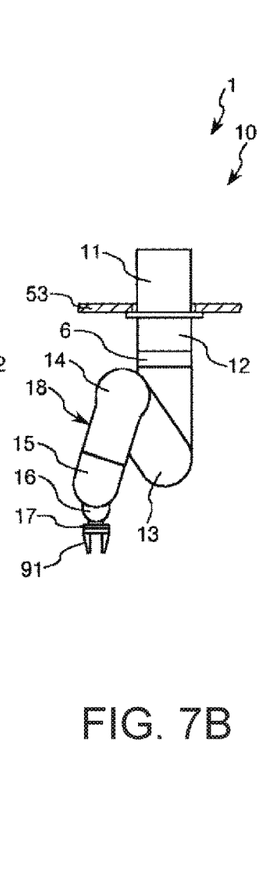
Figure 7C:
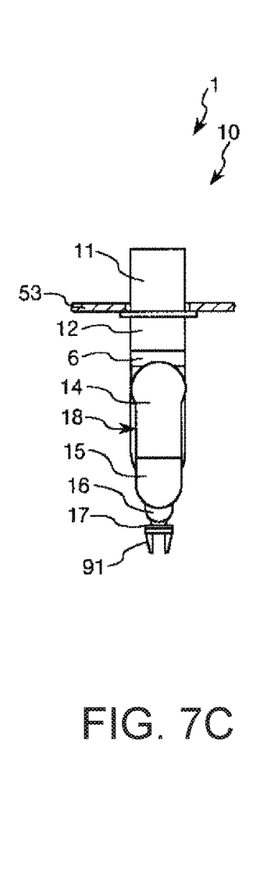
Figure 7D:
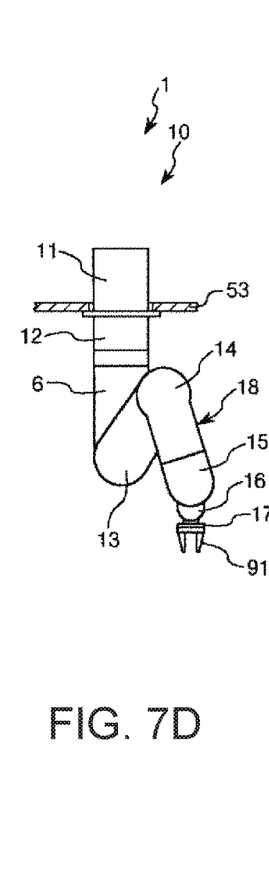
Figure 7E:
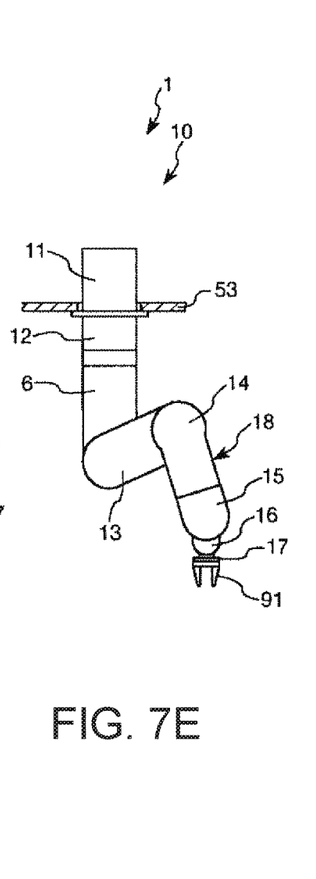
Figure 8:
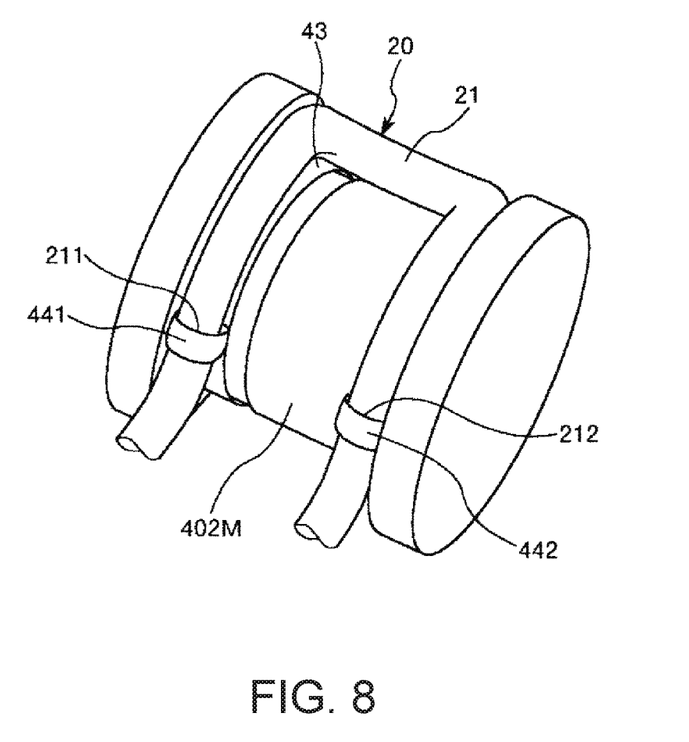
FIG. 8 explains a linear member of the robot in the robot system shown in FIG. 1.

FIG. 1 is a perspective view showing an embodiment of the robot system according to the invention. FIG. 2 is a perspective view showing a robot in the robot system shown in FIG. 1. FIG. 3 is a schematic view showing the robot in the robot system shown in FIG. 1. FIG. 4 shows the robot in a front view of the robot system shown in FIG. 1. FIGS. 5 and 6 each show the robot in a side view of the robot system shown in FIG. 1. That is, the robot shown in FIGS. 5 and 6 is the robot shown in FIG. 4 as viewed from the right in FIG. 4. FIGS. 7A to 7E explain an operation when the robot in the robot system shown in FIG. 1 carries out work. FIG. 8 explains a linear member of the robot in the robot system shown in FIG. 1.

In the description below, as a matter of convenience of explanation, the top side in FIGS. 1, 4 to 7E is referred to as "top" or "upper part", and the bottom side is referred to as "bottom" or "lower part". The base side in FIGS. 1 to 7E is referred to as "proximal end" or "upstream", and the opposite side (hand side) is referred to as "distal end" or "downstream". The up-down direction in FIGS. 1, 4 to 7E is the vertical direction. In FIG. 2, the robot is shown in the state of not being installed inside the cell. In FIG. 8, the linear member and each member near the folding part of the linear member are schematically shown.

A robot system 100 shown in FIG. 1 has a robot cell 50 including a cell 5 and a robot (industrial robot) 1 provided inside the cell 5. The robot 1 has a robot main body (main body part) 10 and a robot controller (control unit), not shown, for controlling the working of the robot main body 10 (robot 1).

The robot system 100 can be used, for example, in a manufacturing process for manufacturing a precision device such as a wristwatch. The robot 1 can, for example, carry out work such as feeding, removing, carrying and assembling the precision device and components forming the precision device.

The robot controller may be arranged inside the cell 5 or may be arranged outside the cell 5. If the robot controller is arranged inside the cell 5, the robot controller may be included inside the robot main body 10 (robot 1) or may be a separate unit from the robot main body 10. The robot controller may be made up of, for example, a personal computer (PC) with a built-in central processing unit (CPU), or the like.

Cell

As shown in FIG. 1, the cell 5 is a member which surrounds (accommodates) the robot 1, and can be easily relocated. Inside the cell 5, the robot 1 mainly carries out work such as assembly.

The cell 5 has four foot parts 54 which allow the entirety of the cell 5 to be installed, for example, in an installation space such as a floor, a frame part 51 supported by the four foot parts 54, a work table (table part) 52 provided in a lower part of the frame part 51, and a ceiling part 53 provided in an upper part of the frame part 51. The outer shape of the cell 5, when viewed from the vertical direction, is square in this embodiment, though it is not particularly limited. The outer shape may also be rectangular or the like, for example.

The frame part 51 has four support posts 511 extending in the vertical direction (up-down direction in FIG. 1), and a frame-like top part 513 provided at the top end of the four support posts 511.

The work table 52, in this embodiment, is in the shape of a rectangular parallelepiped and has a quadrilateral (rectangular) plate on each of its six faces. The work table 52 has its four corners supported by the four support posts 511 of the frame part 51, as viewed from the vertical direction. The robot 1 can carry out each type of work on a work surface 521 of the work table 52.

The ceiling part 53 is a member which supports the robot 1, and in this embodiment, is in the shape of a quadrilateral (rectangular) plate. The ceiling part 53 has its four corners supported by the four support posts 511 of the frame part 51, as viewed from the vertical direction. A base 11 of the robot 1, described later, is fixed (supported) on a ceiling surface (first surface) 531 on the bottom side of the ceiling part 53. The ceiling surface 531 is a flat surface parallel to a horizontal plane.

Between the support posts 511 next to each other above the work table 52, that is, on the four lateral sides of the frame part 51 and the top part 513, a safety board (not shown) or the like may be installed in order to prevent the operator or foreign matters such as dust from entering into the frame part 51.

The cell 5 need not necessarily have the foot parts 54. In such a case, the work table 52 may be installed directly in the installation space.

Robot

As shown in FIGS. 2 to 4, the robot main body 10 has a base (support part) 11 and a robot arm 6. The robot arm 6 includes a first arm (first arm member) (arm part) 12, a second arm (second arm member) (arm part) 13, a third arm (third arm member) (arm part) 14, a fourth arm (fourth arm member) (arm part) 15, a fifth arm (fifth arm member) (arm part) 16 and a sixth arm (sixth arm member) (arm part) 17 (six arms), and a first drive source 401, a second drive source 402, a third drive source 403, a fourth drive source 404, a fifth drive source 405 and a sixth drive source 406 (six drive sources). The fifth arm 16 and the sixth arm 17 form a wrist. At the distal end of the sixth arm 17, for example, an end effector such as a hand 91 can be removably attached. Also, the third arm 14 and the fourth arm 15 form a moving part 18.

The robot 1 is a vertical multi-joint (six-axis) robot in which the base 11, the first arm 12, the second arm 13, the third arm 14, the fourth arm 15, the fifth arm 16 and the sixth arm 17 are connected in this order from the proximal end side toward the distal end side. Hereinafter, each of the first arm 12, the second arm 13, the third arm 14, the fourth arm 15, the fifth arm 16 and the sixth arm 17 is also referred to as the "arm". Each of the first drive source 401, the second drive source 402, the third drive source 403, the fourth drive source 404, the fifth drive source 405 and the sixth drive source 406 is also referred to as the "drive source".

As shown in FIGS. 1 and 4, the base 11 is a portion fixed (member attached) to the ceiling surface 531 of the ceiling part 53 of the cell 5. The fixing method for this is not particularly limited. For example, a fixing method using a plurality of bolts or the like can be employed.

In this embodiment, a plate-like flange 111 provided at a distal end part of the base 11 is attached to the ceiling surface 531. However, the site of the base 11 attached to the ceiling surface 531 is not limited to this example. For instance, a proximal end surface of the base 11 (en surface on the top side in FIG. 4) may be used.

Here, in this robot 1, the connection part between the base 11 and the robot arm 6, that is, the center of a bearing part 62 (see FIG. 5), described later, is situated above the ceiling surface 531 in the vertical direction. The center of the bearing part 62 is not limited to this position and may be situated, for example, below the ceiling surface 531 in the vertical direction or may be situated at the same position as the ceiling surface 531 in the vertical direction.

In the robot 1, since the base 11 is installed on the ceiling surface 531, the connection part between the first arm 12 and the second arm 13, that is, the center of a bearing part, not shown, for rotatably supporting the second arm 13, is situated below the center of the bearing part 62 in the vertical direction.

The base 11 may or may not include a joint 171, described later (see FIG. 3).

The first arm 12, the second arm 13, the third arm 14, the fourth arm 15, the fifth arm 16 and the sixth arm 17 are supported in such a way that each of these arms can be independently displaced in relation to the base 11.

As shown in FIGS. 2 to 4, the first arm 12 has a bent shape. In the state shown in FIG. 4, the first arm 12 has: a first part 121 connected to the base 11 and extending downward in FIG. 4 in the axial direction of a first rotation axis O1 (vertical direction), described later, from the base 11; a second part 122 extending to the left in FIG. 4 in the axial direction of a second rotation axis O2 (horizontal direction) from the bottom end of the first part 121 in FIG. 4; a third part 123 provided at the end of the second part 122 opposite to the first part 121 and extending downward in FIG. 4 in the axial direction of the first rotation axis O1 (vertical direction); and a fourth part 124 extending to the right in FIG. 4 in the axial direction of the second rotation axis O2 (horizontal direction) from the end of the third part 123 opposite to the second part 122. The first part 121, the second part 122, the third part 123 and the fourth part 124 are integrally formed. The second part 122 and the third part 123 are substantially orthogonal to (intersecting with) each other, as viewed from the direction orthogonal to both the first rotation axis O1 and the second rotation axis O2 (as viewed from the front of the sheet of FIG. 4).

The second arm 13 has a longitudinal shape and is connected to a distal end part of the first arm 12, that is, the end of the fourth part 124 opposite to the third part 123.

The third arm 14 has a longitudinal shape and is connected to a distal end part of the second arm 13, that is, the end of the second arm 13 opposite to its end connected to the first arm 12.

The fourth arm 15 is connected to a distal end part of the third arm 14, that is, the end of the third arm 14 opposite to its end connected to the second arm 13. The fourth arm 15 has a pair of support parts 151, 152 facing each other. The support parts 151, 152 are used to connect the fourth arm 15 to the fifth arm 16.

The fifth arm 16 is situated between and connected to the support parts 151, 152 and thus connected to the fourth arm 15. The fourth arm 15 is not limited to this structure and may have, for example, one support part (cantilever).

The sixth arm 17 is in the shape of a flat plate and is connected to a proximal end part of the fifth arm 16. At a distal end part of the sixth arm 17 (end opposite to the fifth arm 16), the hand 91 to grasp, for example, a precision device such as a wristwatch, or a component or the like, is removably installed as an end effector. The driving of the hand 91 is controlled by the robot controller. The hand 91 is not particularly limited and may be, for example, a structure having a plurality of finger parts (fingers). By controlling the operations of the arms 12 to 17 and the like while causing the hand 91 to grasp a precision device, component or the like, the robot 1 can carry out each type of work such as carrying the precision device or component.

As shown in FIGS. 2 to 4, the base 11 and the first arm 12 are connected together via the joint 171. The joint 171 has a mechanism for supporting the first arm 12 connected to the base 11, rotatably in relation to the base 11. This enables the first arm 12 to rotate about the first rotation axis O1 (around the first rotation axis O1) parallel to the vertical direction, in relation to the base 11. The first rotation axis O1 coincides with a normal line to the ceiling surface 531 of the ceiling part 53 to which the base 11 is attached. The first rotation axis O1 is a rotation axis situated on the most upstream side of the robot 1. The rotation around the first rotation axis O1 is carried out by the driving of the first drive source 401 having a motor (first motor) 401M and a decelerator (not shown). The first drive source 401 is driven by the motor 401M and a cable (not shown). The motor 401M is controlled by the robot controller via a motor driver 301 electrically connected to the motor 401M. The decelerator may be omitted.

For the first arm 12, a brake (braking device) for braking the first arm 12 is not provided. Therefore, a reduction in size and weight and simplification of the structure of the robot 1 can be achieved.

The first arm 12 and the second arm 13 are connected together via a joint 172. The joint 172 has a mechanism for supporting one of the first arm 12 and the second arm 13 connected to each other, rotatably in relation to the other. This enables the second arm 13 to rotate about the second rotation axis O2 (around the second rotation axis O2) parallel to the horizontal direction, in relation to the first arm 12. The second rotation axis O2 is orthogonal to the first rotation axis O1. The rotation around the second rotation axis O2 is carried out by the driving of the second drive source 402 having a motor (second motor) 402M and a decelerator (not shown). The second drive source 402 is driven by the motor 402M and a cable (not shown). The motor 402M is controlled by the robot controller via a motor driver 302 electrically connected to the motor 402M. The decelerator may be omitted.

As a brake (braking device) for braking the second arm 13, a brake (not shown) is provided near the axis part of the motor 402M. This brake can prevent the axis part of the motor 402M from rotating and thus enables the attitude of the second arm 13 to be held.

The second rotation axis O2 may be parallel to an axis orthogonal to the first rotation axis O1. Alternatively, the second rotation axis O2 may have a different axial direction from the first rotation axis O1, even if it is not orthogonal to the first rotation axis O1.

The second arm 13 and the third arm 14 are connected together via a joint 173. The joint 173 has a mechanism for supporting one of the second arm 13 and the third arm 14 connected to each other, rotatably in relation to the other. This enables the third arm 14 to rotate about a third rotation axis O3 (around the third rotation axis O3) parallel to the horizontal direction, in relation to the second arm 13. The third rotation axis O3 is parallel to the second rotation axis O2. The rotation around the third rotation axis O3 is carried out by the driving of the third drive source 403 having a motor (third motor) 403M and a decelerator (not shown). The third drive source 403 is driven by the motor 403M and a cable (not shown). The motor 403M is controlled by the robot controller via a motor driver 303 electrically connected to the motor 403M. The decelerator may be omitted.

As a brake (braking device) for braking the third arm 14, a brake (not shown) is provided near the axis part of the motor 403M. This brake can prevent the axis part of the motor 403M from rotating and thus enables the attitude of the third arm 14 to be held.

The third arm 14 and the fourth arm 15 are connected together via a joint 174. The joint 174 has a mechanism for supporting one of the third arm 14 and the fourth arm 15 connected to each other, rotatably in relation to the other. This enables the fourth arm 15 to rotate about a fourth rotation axis O4 (around the fourth rotation axis O4) parallel to the direction of the center axis of the third arm 14, in relation to the third arm 14 (base 11). The fourth rotation axis O4 is orthogonal to the third rotation axis O3. The rotation around the fourth rotation axis O4 is carried out by the driving of the fourth drive source 404 having a motor (fourth motor) 404M and a decelerator (not shown). The fourth drive source 404 is driven by the motor 404M and a cable (not shown). The motor 404M is controlled by the robot controller via a motor driver 304 electrically connected to the motor 404M. The decelerator may be omitted.

As a brake (braking device) for braking the fourth arm 15, a brake (not shown) is provided near the axis part of the motor 404M. This brake can prevent the axis part of the motor 404M from rotating and thus enables the attitude of the fourth arm 15 to be held.

The fourth rotation axis O4 may be parallel to an axis orthogonal to the third rotation axis O3. Alternatively, the fourth rotation axis O4 may have a different axial direction from the third rotation axis O3, even if it is not orthogonal to the third rotation axis O3.

The fourth arm 15 and the fifth arm 16 are connected together via a joint 175. The joint 175 has a mechanism for supporting one of the fourth arm 15 and the fifth arm 16 connected to each other, rotatably in relation to the other. This enables the fifth arm 16 to rotate about a fifth rotation axis O5 (around the fifth rotation axis O5) orthogonal to the direction of the center axis of the fourth arm 15, in relation to the fourth arm 15. The fifth rotation axis O5 is orthogonal to the fourth rotation axis O4. The rotation around the fifth rotation axis O5 is carried out by the driving of the fifth drive source 405. The fifth drive source 405 has a motor (fifth motor) 405M, a decelerator (not shown), a first pulley (not shown) connected to the axis part of the motor 405M, a second pulley (not shown) spaced apart from the first pulley and connected to the axis part of the decelerator, and a belt (not shown) laid over the first pulley and the second pulley. The fifth drive source 405 is driven by the motor 405M and a cable (not shown). The motor 405M is controlled by the robot controller via a motor driver 305 electrically connected to the motor 405M. The decelerator may be omitted.

As a brake (braking device) for braking the fifth arm 16, a brake (not shown) is provided near the axis part of the motor 405M. This brake can prevent the axis part of the motor 405M from rotating and thus enables the attitude of the fifth arm 16 to be held.

The fifth rotation axis O5 may be parallel to an axis orthogonal to the fourth rotation axis O4. Alternatively, the fifth rotation axis O5 may have a different axial direction from the fourth rotation axis O4, even if it is not orthogonal to the fourth rotation axis O4.

The fifth arm 16 and the sixth arm 17 are connected together via a joint 176. The joint 176 has a mechanism for supporting one of the fifth arm 16 and the sixth arm 17 connected to each other, rotatably in relation to the other. This enables the sixth arm 17 to rotate about a sixth rotation axis O6 (around the sixth rotation axis O6) in relation to the fifth arm 16. The sixth rotation axis O6 is orthogonal to the fifth rotation axis O5. The rotation around the sixth rotation axis O6 is carried out by the driving of the sixth drive source 406 having a motor (sixth motor) 406M and a decelerator (not shown). The sixth drive source 406 is driven by the motor 406M and a cable (not shown). The motor 406M is controlled by the robot controller via a motor driver 306 electrically connected to the motor 406M. The decelerator may be omitted.

As a brake (braking device) for braking the sixth arm 17, a brake (not shown) is provided near the axis part of the motor 406M. This brake can prevent the axis part of the motor 406M from rotating and thus enables the attitude of the sixth arm 17 to be held.

The sixth rotation axis O6 may be parallel to an axis orthogonal to the fifth rotation axis O5. Alternatively, the sixth rotation axis O6 may have a different axial direction from the fifth rotation axis O5, even if it is not orthogonal to the fifth rotation axis O5.

The motors 401M to 406M are not particularly limited and may be, for example, servo motors such as AC servo motors or DC servo motors, and the like.

The respective brakes are not particularly limited and may be, for example, electromagnetic brakes, and the like.

For the first arm 12, similarly to the other arms, a brake (not shown) such as an electromagnetic brake, for example, may be provided near the axis part of the motor 401M as a brake for braking the first arm 12.

The motor drivers 301 to 306 are arranged on the base in the illustrated configuration. However, this configuration is not limiting and the motor drivers 301 to 306 may be arranged, for example, in the robot controller.

As shown in FIG. 8, the robot 1 also has a linear member 20 including at least one of a wire and a pipe. The wire may be, for example, an electrical wire or the like. The pipe may be, for example, a tube (tubular member) through which a fluid such as air (gas) or water (liquid) flows. In this embodiment, the case where the linear member 20 is a wire will be described as an example.

The linear member 20 has a folding part (not shown) arranged on the outer circumference of the motor 401M, a folding part 21 arranged on the outer circumference of the motor 402M, and a folding part (not shown) arranged on the outer circumference of the motor 403M. The configurations of the respective folding parts and their vicinities are similar to one another and therefore the folding part arranged on the outer circumference of the motor 402M is described below as a representative example.

As shown in FIG. 8, the folding part 21 is U-shaped, that is, bent into a U-shape. One end part 211 of the folding part 21 is fixed, with a clamp 441, to the outer circumferential surface of a rotating member 43 of the decelerator which is rotatable in relation to the motor 402M. The other end part 212 is fixed to the outer circumferential surface of the motor 402M with a clamp 442. The rotating member 43 is fixed to the first arm 12. The motor 402M is fixed to the second arm 13.

When the motor 402M is driven and the second arm 13 rotates, the rotating member 43 rotates in relation to the motor 402M. In this case, the torsion in the folding part 21 is restrained and the folding part 21 undergoes bending deformation. Thus, the stress acting on the linear member 20 is relaxed. That is, a large bend radius of the linear member 20 can be secured at the folding part 21, and the linear member 20 can be restrained from being twisted or fractured when the second arm 13 rotates. Thus, damage to the linear member 20 can be restrained and durability can be improved.

Up to this point, the configuration of the robot 1 has been briefly described.

Next, the relations between the first arm 12 to the sixth arm 17 will be described, with different expressions and from various perspectives. The third arm 14 to the sixth arm 17 are considered to be in a straightened state, that is, in their longest states. In other words, these arms are considered to be in the state where the fourth rotation axis O4 and the sixth rotation axis O6 coincide with each other or parallel to each other.

First, as shown in FIG. 5, the length L1 of the first arm 12 is set to be longer than the length L2 of the second arm 13.

Here, the length L1 of the first arm 12 is the distance between the second rotation axis O2 and a centerline 621 extending in a left-right direction in FIG. 5 of the bearing part 62 rotatably supporting the first arm 12, as viewed from the axial direction of the second rotation axis O2.

The length L2 of the second arm 13 is the distance between the second rotation axis O2 and the third rotation axis O3, as viewed from the axial direction of the second rotation axis O2.

Also, the first arm 12 and the second arm 13 are configured in such a way that the angle θ formed by the first arm 12 and the second arm 13 can be made 0 degrees, as viewed from the axial direction of the second rotation axis O2, as shown in FIG. 6. That is, the first arm 12 and the second arm 13 are configured in such a way as to be able to overlap with each other, as viewed from the axial direction of the second rotation axis O2.

The second arm 13 is configured in such a way as not to interfere with the ceiling surface 531 of the ceiling part 53 where the base 11 is provided and the second part 122 of the first arm 12, when the angle θ is 0 degrees, that is, when the first arm 12 and the second arm 13 overlap with each other, as viewed from the axial direction of the second rotation axis O2. In the case where the proximal end surface of the base 11 is attached to the ceiling surface 531, the second arm 13 is similarly configured in such a way as not to interfere with the ceiling surface 531 and the second part 122 of the first arm 12.

Here, the angle θ formed by the first arm 12 and the second arm 13 is the angle formed by a straight line passing through the second rotation axis O2 and the third rotation axis O3 (center axis of the second arm 13 as viewed from the axial direction of the second rotation axis O2) 61 and the first rotation axis O1, as viewed from the axial direction of the second rotation axis O2.

By rotating the second arm 13 without rotating the first arm. 12, it is possible to move the distal end of the second arm 13 to a position that is 180 degrees different around the first rotation axis O1, following the state where the angle θ is 0 degrees as viewed from the axial direction of the second rotation axis O2 (state where the first arm 12 and the second arm 13 overlap with each other) (see FIGS. 7A to 7E). That is, by rotating the second arm 13 without rotating the first arm 12, it is possible to move the distal end of the robot arm 6 (distal end of the sixth arm 17) from a first position shown in FIG. 7A to the state where the angle θ is 0 degrees, and then to a second position shown in FIG. 7E that is 180 degrees different around the first rotation axis O1 (see FIGS. 7A to 7E). The third arm 14 to the sixth arm 17 are each rotated according to need.

When the distal end of the second arm 13 is moved to a position that is 180 degrees different around the first rotation axis O1 (when the distal end of the robot arm 6 is moved from the first position to the second position), the distal end of the second arm 13 and the distal end of the robot arm 6 move on a straight line, as viewed from the axial direction of the first rotation axis O1.

The total length (maximum length) L3 of the third arm 14 to the sixth arm 17 is set to be longer than the length L2 of the second arm 13.

Thus, when the second arm 13 and the third arm 14 overlap with each other, as viewed from the axial direction of the second rotation axis O2, the distal end of the sixth arm 17 can be made to protrude from the second arm 13. Thus, the hand 91 can be prevented from interfering with the first arm 12 and the second arm 13.

Here, the total length (maximum length) L3 of the third arm 14 to the sixth arm 17 is the distance between the third rotation axis O3 and the distal end of the sixth arm 17, as viewed from the axial direction of the second rotation axis O2 (see FIG. 5). In this case, the third arm 14 to the sixth arm 17 are in the state where the fourth rotation axis O4 and the sixth rotation axis O6 coincide with each other or parallel to each other, as shown in FIG. 5.

The second arm 13 and the third arm 14 are configured in such a way as to be able to overlap with each other, as viewed from the axial direction of the second rotation axis O2, as shown in FIG. 6.

That is, the first arm 12, the second arm 13 and the third arm 14 are configured in such a way as to be able to overlap with each other simultaneously, as viewed from the axial direction of the second rotation axis O2.

When the above relations are satisfied, by rotating the second arm 13 and the third arm 14 without rotating the first arm 12, the robot 1 can move the hand 91 (distal end of the sixth arm 17) to a position that is 180 degrees different around the first rotation axis O1, following the state where the angle θ formed by the first arm 12 and the second arm 13 is 0 degrees as viewed from the axial direction of the second rotation axis O2 (state where the first arm 12 and the second arm 13 overlap with each other). Using this operation, the robot 1 can be driven efficiently, and the space provided to prevent interference of the robot 1 can be reduced. Also, various advantages can be achieved as follows.

The total length (maximum length) L4 of the third arm 14 and the fourth arm 15 is set to be longer than the length L2 of the second arm 13 and shorter than twice the length L2 of the second arm 13. Preferably, the total length L4 may be set to be longer than 1.2 times the length L2 of the second arm 13 and shorter than 1.8 times the length L2 of the second arm 13, and more preferably longer than 1.4 times the length L2 of the second arm 13 and shorter than 1.8 times the length L2 of the second arm 13. It is preferable that L4 is set, for example, to 1.7 times L2.

Thus, when the second arm 13 and the third arm 14 overlap with each other, as viewed from the axial direction of the second rotation axis O2, the fourth arm 15 can be made to protrude from the second arm 13. Therefore, the hand 91, the sixth arm 17 and the fifth arm 16 can be prevented from interfering with the first arm 12 and the second arm 13.

If L4 is equal to or shorter than L2, there is a risk that the hand 91, the sixth arm 17 and the fifth arm 16 may interfere with the first arm 12 and the second arm 13 when the second arm 13 and the third arm 14 overlap with each other, as viewed from the axial direction of the second rotation axis O2.

If L4 is equal to or longer than twice L2, the robot 1 increases in size and the height L of the cell (see FIG. 1) increases, raising the ceiling part 53. Therefore, the position of the center of gravity of the robot 1 becomes higher and the influence of vibration of the robot 1 increases. That is, there is an increase in vibration generated by a reactive force due to the operation of the robot 1.

Here, the total length (maximum length) L4 of the third arm 14 and the fourth arm 15 is the distance between the third rotation axis O3 and the fifth rotation axis O5, as viewed from the axial direction of the second rotation axis O2 (axial direction of the third rotation axis) (see FIG. 4).

If the above conditions are satisfied, L2 is not particularly limited and may be suitably set according to various conditions. However, preferably L2 may be 50 mm or longer and 600 mm or shorter, and more preferably 100 mm or longer and 200 mm or shorter. It is preferable that L2 is set, for example, to 150 mm.

If the above conditions are satisfied, L4 is not particularly limited and may be suitably set according to various conditions. However, preferably L4 may be 100 mm or longer and 500 mm or shorter, and more preferably 200 mm or longer and 300 mm or shorter. It is preferable that L4 is set, for example, to 259 mm.

The total length (wrist length) L5 of the fifth arm 16 and the sixth arm 17 is not particularly limited and may be suitably set according to various conditions. However, preferably L5 may be 20 mm or longer and 100 mm or shorter, and more preferably 40 mm or longer and 70 mm or shorter. It is preferable that L5 is set, for example, to 55 mm.

Here, the total length (wrist length) L5 of the fifth arm 16 and the sixth arm 17 is the distance between the fifth rotation axis O5 and the distal end of the sixth arm 17, as viewed from the axial direction of the fifth rotation axis O5 (see FIG. 4).

The length L6 between the first rotation axis O1 and the farthest part of the first arm 12 from the first rotation axis O1 in the axial direction of the second rotation axis O2 is not particularly limited and may be suitably set according to various conditions. However, it is preferable that L6 is shorter than half the width W of the cell 5 (see FIG. 1). Therefore, when the robot 1 is driven, the robot 1 can be prevented from contacting the cell 5 or from protruding out of the cell 5 by accident.

Specifically, L6 may be preferably 375 mm or shorter, and more preferably 325 mm or shorter. Even more preferably, L6 may be 275 mm or shorter. Also, it is preferable that L6 is 40 mm or longer.

It is preferable that the maximum lateral width W1max of the first arm 12 is equal to or greater than the maximum lateral width W2max of the other arms, that is, the second arm 13 to the sixth arm 17, as viewed from the axial direction of the second rotation axis O2. Thus, the robot 1 is compact when the first arm 12, the second arm 13 and the third arm 14 overlap with each other, as viewed from the axial direction of the second rotation axis O2. For example, installing the robot 1, carrying the robot 1, packing the robot 1 and the like can be carried out easily.

It is preferable that the rotatable range of the first arm 12 around the first rotation axis O1, the rotatable range of the second arm 13 around the second rotation axis O2, the rotatable range of the third arm 14 around the third rotation axis O3, and the rotatable range of the fourth arm 15 around the fourth rotation axis O4 are each −180 degrees or greater and 180 degrees or smaller.

It is preferable that the rotatable range of the fifth arm 16 around the fifth rotation axis O5 is −140 degrees or greater and 140 degrees or smaller.

It is preferable that the rotatable range of the sixth arm 17 around the sixth rotation axis O6 is −360 degrees or greater and 360 degrees or smaller.

The relations between the capacities of the motors 401M to 406M are not particularly limited and may be suitably set according to various conditions. However, the capacity of the motor 402M may be preferably equal to or greater than the capacity of the motor 403M and equal to or smaller than twice the capacity of the motor 403M, and more preferably equal to or greater than the capacity of the motor 403M and equal to or smaller than 1.5 times the capacity of the motor 403M, and even more preferably equal to or greater than the capacity of the motor 403M and equal to or smaller than 1.1 times the capacity of the motor 403M. It is preferable that the capacity of the motor 402M is, for example, the same as the capacity of the motor 403M.

The robot 1 often takes attitudes where the moment of the structure from the second arm 13 to the sixth arm 17 (hand 91) and the moment of the structure from the third arm 14 to the sixth arm 17 (hand 91) are close to each other. Therefore, there is no problem if the capacity of the motor 402M is the same or close to the capacity of the motor 403M. Therefore, by setting the capacity of the motor 402M as described above, a reduction in size and weight of the robot 1 can be achieved.

The capacity of the motor 401M may be preferably equal to or greater than the capacity of the motor 402M and equal to or smaller than twice the capacity of the motor 402M, and more preferably equal to or greater than the capacity of the motor 402M and equal to or smaller than 1.5 times the capacity of the motor 402M, and even more preferably equal to or greater than the capacity of the motor 402M and equal to or smaller than 1.1 times the capacity of the motor 402M. It is preferable that the capacity of the motor 401M is, for example, the same as the capacity of the motor 402M. Thus, a reduction in size and weight of the robot 1 can be achieved.

The capacity of each of the motors 401M to 403M is not particularly limited and may be suitably set according to various conditions. However, the capacity of each of these motors may be preferably 50 W or greater and 200 W or smaller, and more preferably 80 W or greater and 120 W or smaller. It is preferable that the capacity of each of the motors 401M to 403M is set, for example, to 100 W.

The capacity of each of the motors 404M and 405M is not particularly limited and may be suitably set according to various conditions. However, the capacity of each of these motors may be preferably 10 W or greater and 60 W or smaller, and more preferably 20 W or greater and 40 W or smaller. It is preferable that the capacity of each of the motors 404M and 405M is set, for example, to 30 W.

The capacity of the motor 406M is not particularly limited and may be suitably set according to various conditions. However, the capacity of the motor 406M may be preferably 5 W or greater and 30 W or smaller, and more preferably 10 W or greater and 20 W or smaller. It is preferable that the capacity of the motor 406M is set, for example, to 15 W.

The relations between deceleration ratios of the respective decelerators are not particularly limited and may be suitably set according to various conditions. However, it is preferable that the deceleration ratio of the decelerator of the third arm 14 is set to be higher than the deceleration ratio of the decelerator of the second arm 13.

The rotation angle of the third arm 14 within expected operations of the robot 1 is often greater than the rotation angle of the second arm 13. Therefore, by setting the deceleration ratios as described above, takt time can be reduced and productivity can be improved.

The deceleration ratios of the respective decelerators are not particularly limited and may be suitably set according to various conditions. However, it is preferable that the deceleration ratios of the decelerators of the first arm 12 and the second arm 13 are each set, for example, to 121. It is also preferable that the deceleration ratios of the decelerators of the third arm 14 and the fourth arm 15 are each set, for example, to 101. It is also preferable that the deceleration ratios of the decelerators of the fifth arm 16 and the sixth arm 17 are each set, for example, to 100.

Since the robot 1 has the configuration as described above, the installation space for the robot 1, that is, the cell 5, can be made smaller than in the related-art technique. Therefore, the area of the installation space (installation area) for installing the cell 5, that is, an area S of the cell 5 when the cell 5 is viewed from the vertical direction, can be made smaller than in the related-art technique. Specifically, the area S can be reduced, for example, to 64% of the area in the related-art technique or smaller. Therefore, the width (length of one side in the horizontal direction) W of the cell 5 can be made smaller than the width in the related-art technique, and specifically, for example, 80% of the width in the related-art technique or less. As described above, in the embodiment, the cell 5 is square when viewed from the vertical direction and therefore the width (depth) W of the cell 5 in the longitudinal direction in FIG. 1 and the width (lateral width) W of the cell 5 in the lateral direction in FIG. 1 are the same. However, these widths may be different from each other. In such a case, one or both widths W can be reduced, for example, to 80% of the width in the related-art technique or less.

The area S, specifically, may be preferably smaller than 637500 mm$^2$, and more preferably 500000 mm$^2$ or smaller, and even more preferably 400000 mm$^2$ or smaller. It is particularly preferable that the area S is 360000 mm$^2$ or smaller. With such an area S, the robot 1 can be prevented from interfering with the cell 5 when moving the distal end of the second arm 13 to a position that is 180 degrees different around the second rotation axis O2. Therefore, miniaturization of the cell 5 can be achieved and the installation space for installing the robot system 100 can be reduced. Thus, when a plurality of robot cells 50 is arranged to form a production line, the length of the production line can be restrained from becoming long.

Particularly the area S of 400000 mm$^2$ or smaller is substantially equal to or smaller than the size of the work area where a human works. Therefore, when the area S is 400000 mm$^2$ or smaller, for example, the human and the robot cell 50 can be easily replaced with each other. By replacing the human and the robot cell 50 with each other, the production line can be altered. Also, it is preferable that the area S is 10000 mm$^2$ or greater. This enables easy maintenance inside the robot cell 50.

The width W, specifically, may be preferably less than 850 mm, and more preferably less than 750 mm, and even more preferably 650 mm or less. Thus, effects similar to the above effects can be achieved sufficiently. The width W is the average width of the cell 5 (average width of the frame part 51). Also, it is preferable that the width W is 100 mm or more. This enables easy maintenance inside the robot cell 50.

Since the robot 1 has the configuration as described above, the height (length in the vertical direction) L of the cell 5 can be made lower than the height in the related-art technique. Specifically, the height L can be reduced, for example, to 80% of the height in the related-art technique or below.

The height L, specifically, may be preferably 1700 mm or below, and more preferably 1000 mm or above and 1650 mm or below. When the height L is the upper limit value or below, the influence of vibration generated when the robot 1 operates in the cell 5 can be restrained further. The height L is the average height of the cell 5 including the foot parts 54.

As described above, in the robot system 100, by rotating the second arm 13 and the third arm 14 or the like without rotating the first arm 12, the robot 1 can move the hand 91 (distal end of the robot arm 6) to a position that is 180 degrees different around the first rotation axis O1, following the state where the angle θ formed by the first arm 12 and the second arm 13 is 0 degrees as viewed from the axial direction of the second rotation axis O2 (state where the first arm 12 and the second arm 13 overlap with each other). Therefore, the space to prevent interference of the robot 1 can be reduced. This enables miniaturization of the cell 5 and a reduction in the installation space for installing the robot system 100. Thus, for example, many robot systems 100 per unit length can be arranged along a production line, and the production line can be shortened.

Since the space to prevent interference of the robot 1 can be reduced, the ceiling part 53 can be lowered. Thus, the position of the center of gravity of the robot 1 becomes lower and the influence of vibration of the robot 1 can be reduced. That is, vibration generated by a reactive force due to the operation of the robot 1 can be restrained.

Also, the movement of the robot 1 can be reduced when moving the hand 91. For example, it is possible not to rotate the first arm 12 or to reduce the rotation angle of the first arm 12, and this enables a reduction in takt time and improvement in work efficiency.

In the robot 1, a maximum payload of 2.5 kg or above (for example, 2.5 kg) can be achieved and a cycle time (of moving 1 kg/300 mm in horizontal direction and 25 mm in the vertical direction) of 0.9 seconds or below (for example, 0.9 seconds) can be achieved.

If the operation of moving the hand 91 (distal end of the robot arm 6) of the robot 1 to a position that is 180 degrees different around the first rotation axis O1 (hereinafter also referred to as "shortcut motion") is executed simply by rotating the first arm 12 around the first rotation axis O1 as in the related-art robot, there is a risk that the robot 1 may interfere with the cell 5 and peripheral devices, and therefore retreat points to avoid the interference need to be suggested to the robot 1. For example, when the robot 1 interferes with the safety board (not shown) of the cell 5 if only the first arm 12 is rotated 90 degrees around the first rotation axis O1, a retreat point needs to be suggested to the robot 1 so as not to interfere with the safety board by rotating other arms. Similarly, when the robot 1 interferes with a peripheral device, another retreat point needs to be suggested to the robot 1 so as not to interfere with the peripheral device. In this way, with the related-art robot, multiple retreat points need to be suggested. Particularly in the case of a small-sized cell, a massive number of retreat points are needed and it takes a long time and much effort to suggest these retreat points.

In contrast, in the robot 1, when executing the shortcut motion, there are very few areas and parts with the risk of interference. Therefore, the number of retreat points to be suggested can be reduced and the time and effort required for the suggestions can be reduced. That is, in the robot 1, the number of retreat points to be suggested is, for example, approximately one third of that in the related-art robot and the suggestions are considerably easier.

An area (part) 101 surrounded by double-dotted chain lines on the right side of FIG. 4, of the third arm 14 and the fourth arm 15, is an area (part) where the robot 1 does not interfere or does not easily interfere with the robot 1 itself or other members. Therefore, when a predetermined member is installed in the area 101, the member does not easily interfere with the robot 1 and peripheral devices or the like. Therefore, in the robot 1, a predetermined member can be installed in the area 101. Particularly, when the predetermined member is installed in the area on the right side of FIG. 4 of the third arm 14, of the area 101, the probability of the member interfering with peripheral devices (not shown) arranged on the work table 52 drops further, which is more effective.

The device that can be installed in the area 101 may be, for example, a controller for controlling driving of a sensor of a hand, hand-eye camera or the like, or an electromagnetic valve of an attraction mechanism, or the like.

As a specific example, when an attraction mechanism is to be provided on a hand, for example, if an electromagnetic valve or the like is installed in the area 101, the electromagnetic valve does not obstruct the driving of the robot 1. In this way, the area 101 is highly convenient.

The robot and the robot system according to the invention have been described above on the basis of the illustrated embodiment. However, the invention is not limited to the embodiment. The configuration of each part can be replaced with an arbitrary configuration with similar functions. Also, another arbitrary configuration may be added.

In the embodiment, the site where the base of the robot is fixed is the ceiling part of the cell. However, the invention is not limited to this. The wall part of the cell, the work table, the floor part and the like may also be employed.

In the embodiment, the robot is installed inside the cell. However, the invention is not limited to this. For example, the cell may be omitted. In this case, the site where the base is fixed may be, for example, the ceiling, the wall, the work table, the floor, the ground or the like in the installation space.

In the embodiment, the first surface, which is the surface (plane) where the robot (base) is fixed, is a surface (plane) parallel to the horizontal plane. However, the invention is not limited to this. For example, a surface (plane) tilted in relation to a horizontal plane or a vertical plane may be employed, and a surface (plane) parallel to a vertical plane may be employed as well. That is, the first rotation axis may be tilted in relation to the vertical direction or the horizontal direction and may be parallel to the horizontal direction.

While the number of rotation axes in the robot arm in the embodiment is six, the invention is not limited to this. The number of rotation axes in the robot arm may be, for example, two, three, four, five, or seven or more. That is, while the number of arms (links) in the embodiment is six, the invention is not limited to this. The number of arms may be, for example, two, three, four, five, or seven or more. In this case, for example, in the robot in the embodiment, an arm may be added between the second arm and the third arm, thus achieving a robot in which the number of arms is seven.

While the number of robot arms in the embodiment is one, the invention is not limited to this. The number of robot arms may be, for example, two or more. That is, the robot (robot main body) may be, for example, a multi-arm robot such as a dual-arm robot.

According to the invention, the robot (robot main body) may be a different form of robot. As a specific example, a legged walking (running) robot having a leg part or the like may be employed.

Also, according to the invention, a linear member such as a wire or pipe may be passed through at least a part of the inside of the drive source, for example, the inside of the decelerator and the inside of the motor.

The entire disclosure of Japanese Patent Application No. 2015-090068, filed Apr. 27, 2015 is expressly incorporated by reference herein.

What is claimed is:

1. A robot comprising:
a first arm rotatable about a first rotation axis;
a second arm provided on the first arm rotatably about a second rotation axis that is a different axial direction from an axial direction of the first rotation axis; and
a moving part provided on the second arm rotatably about a third rotation axis, the third rotation axis having an axis direction different from the first rotation axis,
wherein the moving part has a third arm and a fourth arm and the fourth arm is provided on the third arm rotatably about a fourth rotation axis in an axis direction different from the axis direction of the third rotation axis,
a maximum length of the moving part is longer than a length of the second arm and shorter than twice the length of the second arm,
the first arm includes a first segment extending parallel to the second rotation axis and a second segment extending parallel to the first rotation axis, the first segment and the second segment being a single monolithic piece such that a position of the first segment relative to the second segment is fixed and the first segment and the second segment, together, rotate about the first rotation axis,
the second segment of the first arm has a length longer than the length of the second arm, and the second segment of the first arm and the second arm can overlap with each other, as viewed from the axial direction of the second rotation axis, and
the second segment of the first arm connects to the second arm in a connection portion which positions the second arm spaced apart from the second segment such that he second arm rotates about the second rotation axis without contacting the second segment.

2. The robot according to claim 1, wherein the maximum length of the moving part is longer than 1.2 times the length of the second arm and shorter than 1.8 times the length of the second arm.

3. The robot according to claim 1, wherein the third arm is provided on the second arm rotatably about the third rotation axis, and
the fourth arm is provided on the third arm rotatably about a fourth rotation axis.

4. The robot according to claim 1, further comprising:
a fifth arm provided on the fourth arm rotatably about a fifth rotation axis; and
a sixth arm provided on the fifth arm rotatably about a sixth rotation axis.

5. The robot according to claim 1, further comprising a first motor which rotates the first arm, a second motor which rotates the second arm, and a third motor which rotates the moving part,
wherein the second motor has a capacity equal to or above a capacity of the third motor and equal to or below twice the capacity of the third motor.

6. The robot according to claim 5, wherein the capacity of the second motor is equal to or above the capacity of the third motor and equal to or below 1.5 times the capacity of the third motor.

7. The robot according to claim 5, wherein the capacity of the second motor is equal to or above the capacity of the third motor and equal to or below 1.1 times the capacity of the third motor.

8. The robot according to claim 5, further comprising a linear member including at least one of a wire and a pipe,
wherein the linear member has a U-shaped folding part arranged on an outer circumference of at least one of the first motor, the second motor and the third motor.

9. The robot according to claim 1, wherein a maximum lateral width of the first arm is equal to or greater than a maximum lateral width of the second arm and the moving part, as viewed from the axial direction of the second rotation axis.

10. The robot according to claim 1, wherein a brake for braking the second arm and a brake for braking the moving part are provided, and a brake for braking the first arm is not provided.

11. A robot system comprising:
a cell; and
a robot provided in the cell,
the robot comprising:
a first arm rotatable about a first rotation axis;
a second arm provided on the first arm rotatably about a second rotation axis that is a different axial direction from an axial direction of the first rotation axis; and
a moving part provided on the second arm rotatably about a third rotation axis, the third rotation axis having an axis direction different from the first rotation axis,
wherein the moving part has a third arm and a fourth arm and the fourth arm is provided on the third arm rotatably about a fourth rotation axis in an axis direction different from the axis direction of the third rotation axis,
a maximum length of the moving part is longer than a length of the second arm and shorter than twice the length of the second arm,
the first arm includes a first segment extending parallel to the second rotation axis and a second segment extending parallel to the first rotation axis, the first segment and the second segment being a single monolithic piece such that a position of the first segment relative to the second segment is fixed and the first segment and the second segment, together, rotate about the first rotation axis,
the second segment of the first arm has a length longer than the length of the second arm, and the second segment of the first arm and the second arm can overlap with each other, as viewed from the axial direction of the second rotation axis, and
the second segment of the first arm connects to the second arm in a connection portion which positions the second arm spaced apart from the second segment such that he second arm rotates about the second rotation axis without contacting the second segment.

* * * * *